United States Patent
Ward et al.

(10) Patent No.: US 7,760,463 B2
(45) Date of Patent: Jul. 20, 2010

(54) MULTIPLE DISKS IN A SINGLE DISK PACKAGE

(75) Inventors: William Ward, Poway, CA (US); P. Keith Muller, San Diego, CA (US)

(73) Assignee: Teradata US, Inc., Miamisburg, OH (US)

(*) Notice: Subject to any disclaimer, the term of this patent is extended or adjusted under 35 U.S.C. 154(b) by 0 days.

(21) Appl. No.: 11/612,528

(22) Filed: Dec. 19, 2006

(65) Prior Publication Data

US 2008/0144208 A1    Jun. 19, 2008

(51) Int. Cl.
    *G11B 5/55* (2006.01)
(52) U.S. Cl. .................... 360/78.12; 711/112
(58) Field of Classification Search ........... 360/78.12
    See application file for complete search history.

(56) References Cited

U.S. PATENT DOCUMENTS

| | | | | | |
|---|---|---|---|---|---|
| 4,423,448 | A | * | 12/1983 | Frandsen | 360/78.12 |
| 4,577,240 | A | * | 3/1986 | Hedberg et al. | 360/78.12 |
| 5,111,345 | A | * | 5/1992 | Muller | 360/78.12 |
| 5,341,351 | A | * | 8/1994 | Ng | 360/78.12 |
| 5,343,347 | A | * | 8/1994 | Gilovich | 360/78.12 |
| 5,355,486 | A | * | 10/1994 | Cornaby | 360/78.12 |
| 5,610,808 | A | * | 3/1997 | Squires et al. | 360/78.12 |
| 5,805,386 | A | * | 9/1998 | Faris | 360/78.12 |
| 5,983,485 | A | * | 11/1999 | Misso | 29/603.03 |
| 6,005,743 | A | * | 12/1999 | Price et al. | 360/78.12 |
| 6,121,742 | A | * | 9/2000 | Misso | 360/75 |
| 6,519,109 | B1 | * | 2/2003 | Price et al. | 360/78.12 |
| 6,658,201 | B1 | * | 12/2003 | Rebalski | 386/98 |
| 6,690,549 | B1 | * | 2/2004 | Aikawa et al. | 360/264.4 |
| 6,735,032 | B2 | * | 5/2004 | Dunn et al. | 360/78.12 |
| 6,847,504 | B1 | * | 1/2005 | Bennett et al. | 360/78.12 |
| 7,102,842 | B1 | * | 9/2006 | Howard | 360/78.12 |
| 7,324,301 | B2 | * | 1/2008 | Tormasi | 360/78.12 |
| 7,385,781 | B1 | * | 6/2008 | Craig et al. | 360/78.12 |

FOREIGN PATENT DOCUMENTS

| JP | 03263659 A | * | 11/1991 |
|---|---|---|---|
| JP | 06215339 A | * | 8/1994 |
| JP | 2002324371 A | * | 11/2002 |

* cited by examiner

*Primary Examiner*—Hoa T Nguyen
*Assistant Examiner*—James L Habermehl

(57) ABSTRACT

A disk drive having a single drive motor and multiple platters that incorporates two discrete data paths, actuators and heads to the disk platters. Utilizing the economy of very large capacity disk platters, two or more disk drives can be created within a single physical enclosure. These two disks will be share many common parts such as the drive enclosure and spindle motor, but will have the performance and appearance to the system as two or more independent disks. Instead of having one actuator arm, the virtual disks will have two or more actuator arms and two or more sets of digital electronics. The storage on all the platters is divided up among the actuators so that no storage location is shared, but all the actuators will operate concurrently. Each actuator will have exclusive use of a subset of the data storage. Disks normally only have one actuator connected to multiple heads, at least one per surface, which only allow a single data seek and data transfer at a time. The virtual disks will have two or more actuators, one for each virtual disk, improving performance for the capacity of the platters through concurrent data seeks and transfers to different data areas.

12 Claims, 2 Drawing Sheets

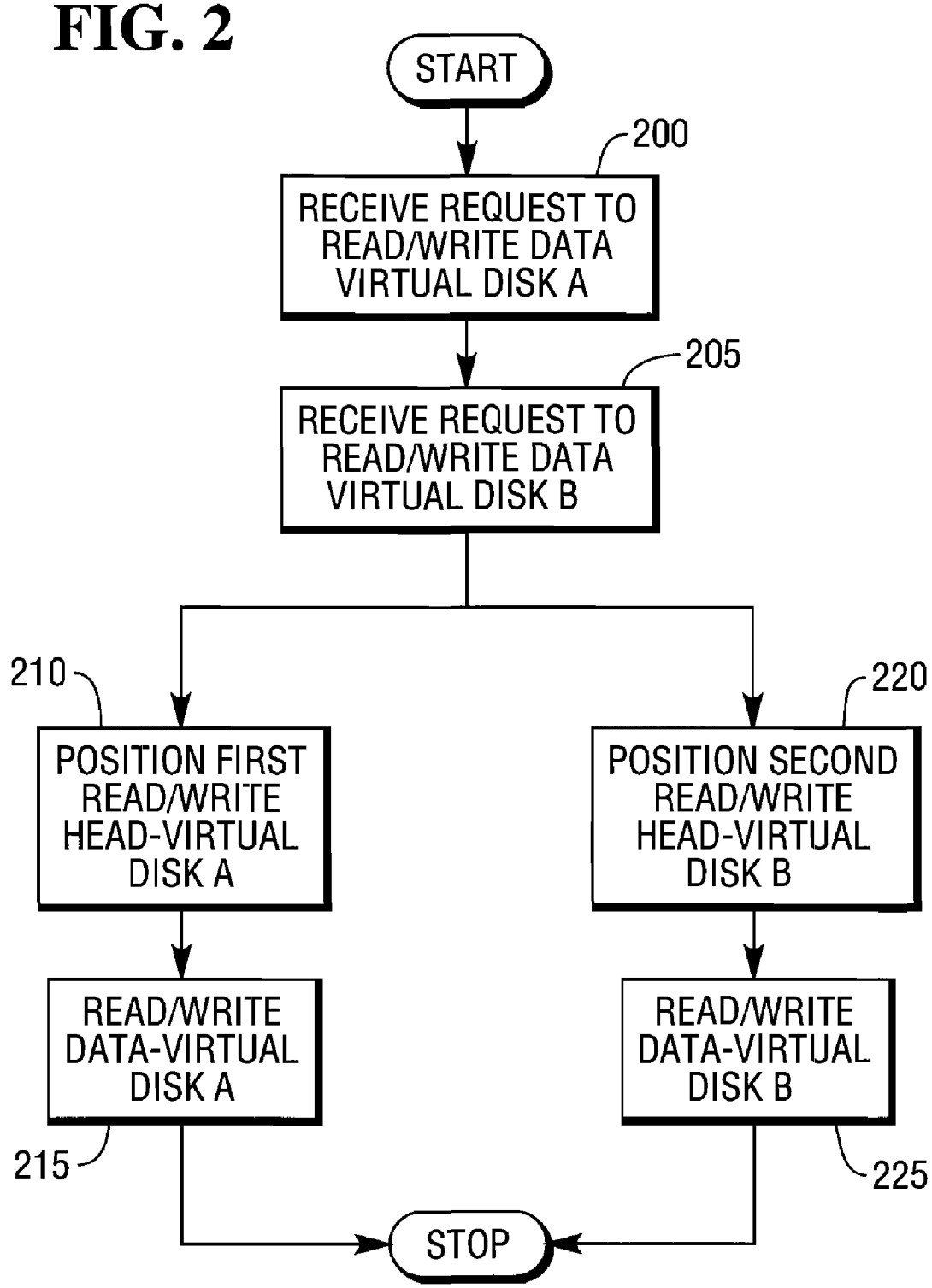

MULTIPLE DISKS IN A SINGLE DISK PACKAGE

BACKGROUND

Technology advances continue to increase the storage capacity of disk drives at a rate that is much faster than the improvements in disk drive performance. The manufacturers of disk drives continue to focus their research and development on increasing the storage capacity of a disk platter.

As a result it is common to have disks in which the storage capacity continues to double but for which the performance per unit of storage is rapidly getting worse with each generation.

In many applications this problem is addressed by designing systems with a larger number of smaller disks to increase concurrent parallel access to the data.

SUMMARY

Described below is a storage disk. The storage disk includes a plurality of disk platters mounted on a common spindle. The disk platters each have an upper surface and a lower surface. A drive motor is operable to rotate the spindle to rotate the disk platters about a common access. Two or more actuator assemblies each have at least one actuator arm. The actuator arm(s) each have at least one read/write head. The actuator arms are configured to position the read/write head(s) over respective disk platter surfaces such that each disk platter surface is contacted by the read/write head of the actuator arm of only one actuator assembly.

Also described below is a method of performing a read/write operation on a storage disk. A first read/write head of a first actuator assembly is positioned to a track on a first disk platter surface. Data is read from or written to the track on the first disk platter surface. As second read/write head is positioned to a track on a second disk platter surface while positioning the first read/write head.

Also described below is a method of performing a read/write operation on a storage disk. The technique includes the steps of positioning a first read/write head of a first actuator arm to a track on a first disk platter surface. Data is read from or written to the track on the first disk platter surface. A second read/write head is positioned to a track on a second disk platter surface. Data is read from or written to the track on the second disk platter surface while positioning the first read/write head and/or reading data from the track on the first disk platter surface or writing data to the track on the second disk platter surface.

BRIEF DESCRIPTION OF THE DRAWINGS

FIG. 2 illustrates a technique for performing read/write operations on the storage disk of FIG. 1.

DETAILED DESCRIPTION

Figure 1:
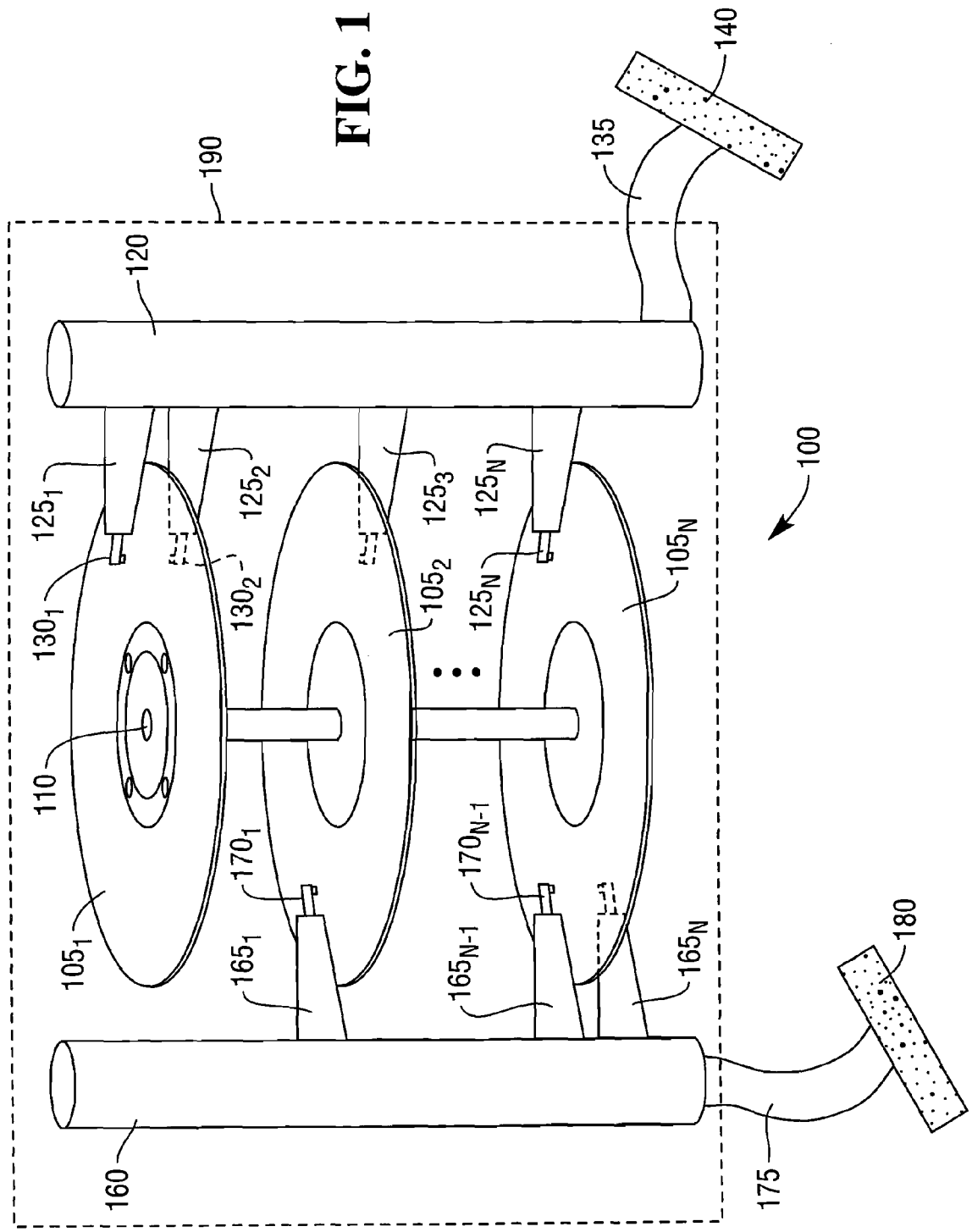
FIG. 1 shows an improved storage disk

FIG. 1 shows a storage disk 100 in which the techniques described below are embodied. Storage disk 100 includes a stack of circular disk platters $105_1, 105_2 \ldots 105_N$. For effective use of the techniques described below, there are at least four disk platters but it is envisaged that the number of platters could be larger or greater than this number. The platters 105 are mounted on a common spindle 110. Each disk platter 105 is fixedly mounted on spindle 110 so that rotation of the spindle 110 causes the disk platters to rotate about a common axis that is defined by spindle 110.

An actuator assembly 120 includes at least one and preferably a plurality of actuator arms $125_1 \ldots 125_N$. The actuator arms each have an upper surface and a lower surface. At least some of the actuator arms have a read/write head mounted on the upper surface, lower surface or both actuator arm surfaces. Actuator arm $125_1$ has read/write head $130_1$ mounted on the lower surface for example and actuator arm $125_2$ has read/write head $130_2$ mounted on the upper surface. Actuator arm $125_1$ is configured to position read/write head $130_1$ over an upper surface of disk platter $105_1$. Actuator arm $125_2$ is configured to position read/write head $130_2$ over a lower surface of the disk platter $105_1$.

Actuator assembly 120 also includes actuator arm $125_3$ configured to position a read/write head (obscured) over a lower surface of disk platter $105_2$. Actuator arm $125_N$ is configured to position read/write head $125_N$ over an upper surface of disk platter $105_N$.

Actuator assembly 120 in one embodiment includes a series of pairs of actuator arms, some of which have one or two read/write heads positioned over respective surfaces of the disk platters.

Actuator assembly 120 is connected to data bus 135. Data bus 135 connects actuator assembly 120 to data port 140. Data to be written to surfaces of the disk platters 105 is conveyed through data port 140 over data bus 135 through actuator assembly 120 and actuator arms 125 to read/write heads 130. Data to be read from surfaces of the disk platters 105 is read by read/write heads 130 and conveyed through actuator arms 125 through actuator assembly 120 and data bus 135 to data port 140.

Read/write heads 130 read data from or write data to circular tracks on the disk platter surfaces as the platters rotate. Data is stored in sectors. A sector is defined by two arcs in turn representing part of the circumference of a track. A cylinder describes a set of circular tracks all lying on different surfaces of disk platters 105. The tracks in a cylinder are all within a maximum radial distance from the center of each platter 105.

Storage disk 100 includes second actuator assembly 160. As shown in FIG. 1, the actuator assembly includes actuator arms $165_1, 165_{N-1}$ and $165_N$. Actuator arm $165_1$ is configured to position read/write head 170 on an upper surface of disk platter $105_2$. Actuator arm $165_{N-1}$ is configured to position read/write head $170_{N-1}$ on an upper surface of disk platter $105_N$ and actuator arm $165_N$ positions a read/write head (obscured) on a lower surface of disk platter $105_N$.

Actuator assembly 160 is attached to data bus 175 which in turn is connected to data port 180. Data is written to and read from disk platter surfaces through read/write heads 170, actuator arms 165, actuator assembly 160, data bus 175 and data port 180 as described above with reference to actuator assembly 120.

Storage disk 105 is also packaged in a robust housing 190 for dust and impact protection.

The storage disk 100 shown in FIG. 1 includes two actuator assemblies, actuator assembly 120 and actuator assembly 160. It will be appreciated that a greater number of actuator assemblies and associated components could be included within housing 190.

As shown in FIG. 1 each platter surface is only accessed or contacted by the read/write head of only one of the actuator assemblies. For example both surfaces of disk platter $105_1$ are accessed only by actuator assembly 120. Actuator assembly 120 also accesses the lower surface of disk platter $105_2$ and the upper surface of disk platter $105_N$.

Similarly the upper surface of disk platter $105_2$ and both surfaces of disk platter $105_N$ are only accessed by the actuator arms of actuator assembly 160.

Storage disk 100 effectively functions as two viral disks within housing 190. The first viral disk consists of actuator assembly 120 and one set of disk platter surfaces. The second virtual disk consists of actuator assembly 160 and a second set of disk platter surfaces different to the first set.

The particular disk platter surfaces that are associated with each of the actuators can be varied. As shown in FIG. 1 for example alternate disk platter surfaces on the spindle 110 are assigned to each actuator assembly. It will be appreciated that this configuration can be changed for example the surfaces of the first half of the disk platters on the spindle are assigned in one form to actuator assembly 120 and the remaining disk platter surfaces on the spindle are assigned to actuator assembly 160.

One of the advantages of storage disk 100 is that read/write operations can be performed simultaneously on disk platter surfaces within storage disk 100.

FIG. 2 shows one technique for performing simultaneous read/write operations on storage disk 100. The storage system receives 200 a request to write to or read from virtual disk A. Viral disk A is the set of disk platter surfaces in storage system 100 associated with a first actuator assembly.

Before the request is actioned the storage system receives 205 a second request to read from or write data to virtual disk B. Virtual disk B is a further set of disk platter surfaces within storage system 100 that are associated with a second actuator assembly. The disk platter surfaces forming virtual disk A are different to the disk platter surfaces forming virtual disk B.

A first read/write head of the first actuator assembly is positioned 210 on a track on one of the disk platter surfaces forming virtual disk A. This positioning step is known as a data seek. Once the read/write head is positioned to the correct track on the disk platter, data is read from or written to 215 the track on the second disk platter. Step 245 is known as a data transfer step.

Before request 200 has been completed, request 205 is able to be actioned. The second read/write head performs a data seek by being positioned 220 to a track on a second disk platter surface forming part of virtual disk B. Once the second read/write head has been positioned, data is read from or written to 225 the track on the second disk platter. Step 225 is known as a data transfer step.

The storage disk is configured to enable the positioning step 220 to be performed while either performing the positioning step 210 or the read/write step 215.

The read/write step 225 can be performed while either performing the positioning step 210 or the read/write step 215.

Step 210 followed by step 215 can be interchangeably performed with step 220 followed by step 225.

The above techniques provide an improvement over disks that have only one actuator connected to multiple read/write heads. Such disks only allow a single data seek and data transfer at a time. The techniques described above by contrast include two or more actuator assemblies. Performance is improved through concurrent or simultaneous data seeks and data transfer operations to different data areas.

The techniques described above effectively implement two or more virtual storage disks within a single housing. The two virtual disks share the same spindle motor. The storage system described above is less expensive and smaller in physical volume than the equivalent two separate disks each having a single actuator assembly.

The text above describes one or more specific embodiments of a broader invention. The invention also is carried out in a variety of alternative embodiments and thus is not limited to those described here. Those other embodiments are also within the scope of the following claims.

We claim:

1. A storage disk system, comprising:
   a plurality of disk platters mounted on a common spindle, the disk platters each having an upper surface and a lower surface;
   a drive motor operable to rotate the spindle to rotate the disk platters about a common axis; and
   two or more actuator assemblies, the actuator assemblies each having at least one actuator arm, the actuator arm(s) each having at least one read/write head configured such that each disk platter surface is only accessed by one read/write head, wherein a first actuator assembly and a first set of disk platter surfaces are associated as a first virtual disk, wherein a second actuator assembly and a second set of disk platter surfaces are associated as a second virtual disk, wherein a first disk platter of said plurality of disk platters has a first disk platter surface associated with the first virtual disk and a second disk platter surface associated with the second virtual disk, wherein a second disk platter of said plurality of disk platters has both its upper surface and its lower surface associated with the first virtual disk, wherein the system receives a first operation comprising at least one of a read or write that is specified to be performed on the first virtual disk by the first actuator assembly and receives a second operation comprising at least one of a read or write that is specified to be performed on the second virtual disk by the second actuator assembly, and wherein at least a portion of the second operation is performed by the second actuator assembly concurrently with the first operation by the first actuator assembly.

2. The system of claim 1 where at least one of the actuator assemblies has at least two actuator arms with read/write head(s), one of the read/write heads positioned over an upper surface of one of the disk platters and another one of the other read/write heads positioned over a lower surface of the disk platter.

3. The system of claim 1 where at least two of the actuator assemblies each have at least one actuator arm with a read/write head, the read/write head of a first actuator assembly is positioned over an upper surface of one of the disk platters and the read/write head of a second actuator assembly is positioned over a lower surface of the disk platter.

4. The system of claim 1 where the disk platters have a plurality of data tracks on at least one of the surfaces of at least one of the disk platters.

5. The system of claim 4 having data stored in the data tracks.

6. A method of performing a read/write operation on a storage disk having a plurality of disk platters and two or more actuator assemblies, the disk platters each having an upper surface and a lower surface, the actuator assemblies each having two or more actuator arms, the actuator arms each having one or more read/write heads, the method comprising:
   receiving a first operation comprising at least one of a read or write that is specified to be performed on a first virtual disk comprising a first actuator assembly and a first set of disk platter surfaces including a first disk platter surface of a first disk platter and the upper and lower surfaces of a second disk platter;

positioning a first read/write head of the first actuator assembly to a track on the first disk platter surface of the first virtual disk;

reading data from or writing data to the track on the first disk platter surface;

receiving a second operation comprising at least one of a read or write that is specified to be performed on a second virtual disk comprising a second actuator assembly and a second set of disk platter surfaces including a second disk platter surface of the first disk platter; and positioning a second read/write head of the second actuator assembly to a track on the second disk platter surface of the second virtual disk while positioning the first read/write head.

7. The method of claim 6 further comprising the step of reading data from or writing data to the track on the second disk platter surface.

8. The method of claim 7 comprising the step of reading data from or writing data to the track on the second disk platter surface while positioning the first read/write head.

9. The method of claim 7 comprising the step of reading data from or writing data to the track on the second disk platter surface while reading data from or writing data to the track on the first disk platter surface.

10. A method of performing a read/write operation on a storage disk having a plurality of disk platters and two or more actuator arms each having one or more read/write heads, the disk platters each having an upper surface and a lower surface, the method comprising:

receiving a first operation comprising at least one of a read or write that is specified to be performed on a first virtual disk comprising a first actuator assembly and a first set of disk platter surfaces including a first disk platter surface of a first disk platter and the upper and lower surfaces of a second disk platter;

positioning a first read/write head of a first actuator arm to a track on the first disk platter surface of the first virtual disk;

reading data from or writing data to the track on the first disk platter surface;

receiving a second operation comprising at least one of a read or write that is specified to be performed on a second virtual disk comprising a second actuator assembly and a second set of disk platter surfaces including a second disk platter surface of the first disk platter;

positioning a second read/write head of a second actuator arm to a track on the second disk platter surface of the second virtual disk; and reading data from or writing data to the track on the second disk platter surface while positioning the first read/write head and/or reading data from the track on the first disk platter surface or writing data to the track on the first disk platter surface.

11. The method of claim 10 further comprising positioning the second read/write head of the second actuator arm while positioning the first read/write head.

12. The method of claim 10 further comprising positioning the second read/write head of the second actuator arm while reading data from or writing data to the track on the first disk platter surface.

* * * * *